US00RE35818E

United States Patent [19]

Tahara et al.

[11] E Patent Number: Re. 35,818

[45] Reissued Date of Patent: Jun. 2, 1998

[54] NON-AQUEOUS ELECTROLYTE SECONDARY BATTERY AND METHOD OF PRODUCING THE SAME

[75] Inventors: Kensuke Tahara; Hideki Ishikawa; Tsugio Sakai, all of Sendai; Akifumi Sakata, Tokyo; Fumiharu Iwasaki, Tokyo; Seiji Yahagi, Tokyo, all of Japan

[73] Assignee: Seiko Instruments Inc., Japan

[21] Appl. No.: 539,825

[22] Filed: Oct. 6, 1995

Related U.S. Patent Documents

Reissue of:

[64] Patent No.: 5,401,599
Issued: Mar. 28, 1995
Appl. No.: 127,960
Filed: Sep. 28, 1993

[30] Foreign Application Priority Data

| | | | |
|---|---|---|---|
| Oct. 1, 1992 | [JP] | Japan | 4-322028 |
| Oct. 2, 1992 | [JP] | Japan | 4-265179 |
| Mar. 18, 1993 | [JP] | Japan | 5-59165 |
| Mar. 22, 1993 | [JP] | Japan | 5-062264 |
| Aug. 17, 1993 | [JP] | Japan | 5-203479 |

[51] Int. Cl.[6] ..... H01M 4/02

[52] U.S. Cl. ..... 429/218; 429/224; 201/219; 201/242; 201/291; 201/292; 201/293

[58] Field of Search ..... 429/218, 219, 429/224; 204/242, 291, 292, 293, 219

[56] References Cited

U.S. PATENT DOCUMENTS

| | | | |
|---|---|---|---|
| 4,980,251 | 12/1990 | Thackeray et al. | 429/224 |
| 5,011,752 | 4/1991 | Kordesch et al. | 429/206 |

*Primary Examiner*—Maria Nuzzolillo
*Attorney, Agent, or Firm*—Adams & Wilks

[57] ABSTRACT

A non-aqueous electrolyte secondary battery has a negative electrode, a positive electrode and a non-aqueous electrolyte with lithium ion conductivity. A composite oxide produced from a metal or a metalloid and lithium represented by composition formula $Li_xMO$ (where M represents metals or metalloids other than alkali metals, and x satisifies $0 \leqq x$) is used as an active material of one or both of the negative electrode and the positive electrode. The battery exhibits a large charging/discharging capacity and a high energy density together with smaller polarization (internal resistance) on charging and discharging which facilitates a large current charging and discharging with a long cycle life and reduces deterioration due to excess charging and excess discharging.

19 Claims, 13 Drawing Sheets

NON-AQUEOUS ELECTROLYTE SECONDARY BATTERY AND METHOD OF PRODUCING THE SAME

Matter enclosed in heavy brackets [ ] appears in the original patent but forms no part of this reissue specification; matter printed in italics indicates the additions made by reissue.

BACKGROUND OF THE INVENTION

The present invention relates to non-aqueous electrolyte secondary batteries using non-aqueous electrolyte with lithium ion conductivity where material capable of occluding and emitting lithium is used as the negative active material and/or positive active material. In particular, it relates to novel negative active material and positive active material which provide novel secondary batteries of high voltage and high energy density having a long cycle service life with a graded charge/discharge characteristic.

A non-aqueous electrolyte battery, which uses lithium as a negative active material, has advantages such as lower self-discharge, high reliability for a long time, high voltage and high energy density, and so forth, and is widely utilized in power sources for a memory backup, camera and the like as a primary battery. However in the recent years, with the remarkable development of portable type electronic devices and communication equipment and the like, there have been proposed various kinds and types of equipments which require large current output to the batteries as a power supply, thus secondary batteries of high energy densities capable of recharging and re-discharging are now in strong demand from the view point of economical efficiency, and compact size and light weight of the devices. For this reason, research and development for increasing the secondary batteries from among the non-aqueous electrolyte batteries having a high energy density are actively performed and a part thereof is now in practical use. However, the energy density, charge and discharge cycle life time, and reliability are still unsatisfactory.

Conventionally, the positive active material constituting the positive electrode of a secondary battery of such kind includes three kinds of types due to charge and discharge reaction profiles as undermentioned. The first type is one in which lithium ion (cation) only moves in or out of spaces between layer-to-layer, lattice positions, or gaps among lattices of the crystal depending on intercalation and deintercalation reactions and the like as seen in metal chalcogenides such as $TiS_2$, $MoS_2$, and $NbSe_3$, and in metal oxides such as $MnO_2$, $MoO_3$, $V_2O_5$, $Li_xCoO_2$, $Li_xNiO_2$, and $Li_xMn_2O_4$, and in like cases. The second-type is one in which mainly anion only stably moves in and out by means of doping and undoping reactions as seen in conductive polymers such as polyaniline, polypyrrole, polyparaphenylene. The third type is one in which, lithium cation and anion can together move in or out as seen in graphite intercalation compounds and conductive polymers such as polyacene and the like (intercalation, deintercalation or doping, undoping and the like).

On the other hand, for the negative active material constituting the negative electrode of the battery of this kind, the basest electrode potential is provided in case of using metal lithium independently, and correspondingly the battery combined with the positive electrode using the positive active material as described above advantageously has the highest output voltage with a high energy density. However in this case, the problem arises because dendrite or passive compounds are generated on the negative electrode depending on charge or discharge to produce considerable deterioration due to charge and discharge and to shorten the cycle service life time. To solve this problem there are proposed various utilizations of materials as a negative active material; namely, (1) alloys obtained by combining lithium with other metals such as Al, Zn, Sn, Pb, Bi, and Cd; (2) intercalation compounds or insertion compounds where lithium ion is incorporated into the crystal structure of inorganic compounds such as $WO_2$, $MoO_2$, $Fe_2O_3$, $TiS_2$, and the like, graphite and carbonaceous materials obtained by baking organic material; and (3) conductive polymers such as polyacene, polyacetylene and the like in which lithium ion is doped.

However in general, in case where the negative electrode using material capable of occlusion and emission of lithium ion (other than metal lithium described above as the negative active material) is combined with the positive electrode using the positive active material described above to produce the battery, then the electrode potential of these negative active materials is nobler than the electrode potential of metal lithium, and a drawback therefore arises in considerably lowering an operating voltage of the battery compared to the case of independently using the metal lithium as a negative active material. For example, the operating voltage is lowered by 0.2 to 0.8 V in case of using an alloy of lithium and metals such as Al, Zn, Pb, Sn, Bi, and Cd, by 0 to 1 V for carbon-lithium intercalation compounds, and by 0.5 to 1.5 V for lithium ion insertion compounds such as $MoO_2$, $WO_2$ and the like.

Since elements other than lithium are involved as negative electrode constituent elements, the capacity and energy density per unit volume and unit weight are considerably lowered correspondingly.

In addition, when using an alloy of lithium and other metals in (1) described above, there are such problems that the utilization efficiency of lithium is low during charge and discharge, and the cycle life is short due to occurrence of cracks in the electrode to generate splits on account of repeated charge and discharge and the like. In the lithium intercalation compound or insertion compound in case (2), deteriorations such as decay of the crystal structure and generation of irreversible material are generated by excess charge and excess discharge, and the electrode potential is high (noble) in many cases, which results in a drawback of reducing an output voltage of the battery. In the conductive polymer in case (3), there is such a problem that the charge and discharge capacity, in particular, the charge and discharge capacity per unit volume, is small.

For these reasons, to obtain a long cycle life secondary battery having a graded charge and discharge characteristic with high voltage and high energy density, there is required a negative active material having a larger effective charge and discharge capacity, i.e., the amount capable of reversible occlusion and emission of lithium ion simultaneously with a lower (baser) electrode potential with respect to lithium without deterioration of crystal structure decay and irreversible substance generation due to the occlusion and emission of lithium ion at charge and discharge.

On the other hand, in the positive active material, the first type has a drawback in that a considerable deterioration arises due to crystal deintegration and irreversible substance generation on excess charging and excess discharging although its energy density is larger. To the contrary, in the second and third types, the charge and discharge capability, in particular, disadvantageously the charge and discharge capacity, and energy density per unit volume are significantly smaller.

Therefore, to obtain a high capacity and high energy density of a secondary battery having an upgraded excess charging characteristic and excess discharging characteristic, there is required a positive active material in which a larger amount of lithium ion can reversibly be occluded and emitted without crystal deintegration and irreversible substance generation due to the excess charge and excess discharge.

SUMMARY OF THE INVENTION

An object of the present is to provide a non-aqueous electrolyte secondary battery using a material capable of absorbing and releasing lithium as a negative electrode active material.

Another object of the present is to provide a novel secondary battery having a high voltage and a high energy density in which charge and discharge characteristics are excellent, the cycle life is long, and reliability is high.

Still another object of the present invention is to provide a non-aqueous electrolyte secondary battery using a composite oxide containing lithium as a negative electrode active material.

A further object of the present invention is to provide a method for producing a non-aqueous electrolyte secondary battery in which inside the battery after assembly thereof or inside or outside the battery depending on the way of producing the battery, monoxide MO of metal or metalloid M and lithium or material containing lithium are electrochemically reacted to incorporate lithium ion into the monoxide MO of the metal or the metalloid and to produce composite oxide $Li_xMO$ of the metal or the metalloid and lithium.

To solve the problem hereinbefore described, the present invention uses a novel lithium ion occlusion/emission material composed of composite oxide which is composed of metal or metalloid M and lithium Li according to composition formula $Li_xMO$ (where M represents a metal or a metalloid other than alkali metals, and $0 \leqq x$ is satisfied) as an active material of at least one of the negative electrode or positive electrode of the battery of this kind. The composite oxide capable of lithium ion occlusion/emission in a non-aqueous electrolyte by electrochemical reaction is used wherein lithium is contained in crystal structure or amorphous structure of the oxide having a composition ratio of 1:1 composed of metal or metalloid M other than alkali metals and oxygen O. For the metal or the metalloid M forming the composite oxide, any suitable material that can produce monoxide is used; namely, transition metals such as Fe, Mn, Ti, V, Nb, Co, and Ni; metals other than alkali metals such as Zn, Cd, Mg, Ba, Pb, and Sn; and metalloids such as Si, B, Ge, and Sb; and the like. Such metals or metalloids M and oxygen O provide a composition ratio of 1:1 as a standard as described above, however on synthesizing, a non-stoichiometric compound generates due to deficiency or excess of the metal or the metalloid M and oxygen O, and the range of such deficiency and excess depends on the kinds of M, and reaches as high as ±25%. One possessing such non-stoichiometric composition is also included in the present invention. In particular, when the transition metal is used as a metal M, deficiency of the metal M or oxygen O tends to produce a compound having a high non-stoichiometric degree, thus such produced compound provides a good amount of sites capable of occlusion of lithium ion into the crystal structure or amorphous structure of that product material. This provides an advantage that lithium ion has a high mobility and a high electron conductivity to easily produce a larger charge/discharge capacity and a lower polarization. Lithium content x may preferably be within a range where the composite oxide can stably be present, and in particular within a scope of $0 \leqq x \leqq 2$.

Two methods are proposed for a preferable method of producing the composite oxide composed of the metal or the metalloid M and lithium which are used for negative and/or positive active materials of the battery according to the present invention, however such methods are not limited to these examples.

The first method is that each element of the metal or the metalloid and lithium, or the compound of these but including oxygen, are mixed at a predetermined mol ratio, thermal treated, and synthesized in a non-oxidation atmosphere such as an inert atmosphere or vacuum and the like or in a weak reduction atmosphere or in an atmosphere where the oxygen amount is controlled. The metal or the metalloid and lithium to be starting materials may preferably be their oxide or hydroxide, or salt such as carbonate or nitrate, or organic compound or compounds producing oxide by heating in an inert atmosphere or in vacuum. A temperature for heating depends on the starting materials and the heating atmospheres, where the composition is available at a temperature equal to or more than 400° C., preferably equal to or more than 600° C., and more preferably at equal to or more than 700° C.

The composite oxide of the metal or the metalloid and lithium thus obtained is used as it is, or used after crushing and granulating depending on the requirement, as a negative and/or positive active material. As in the second method mentioned below, there can be used, as an active material, one in which the composite oxide containing the lithium and metal lithium or material including lithium are electrochemically reacted with each other, whereby the composite oxide is allowed to occlude therein with lithium ion, or reversely to emit lithium ion, and to enable an increase or decrease of the lithium content.

The second method is that the metal such as FeO, MnO, TiO, VO, NbO, Nio, CoO, ZnO, SnO, MgO, BaO, SiO or GeO or monoxide MO of the metal or the metalloid M is electrochemically reacted with lithium or material containing lithium so that the lithium ion is occluded in the monoxide MO to produce the composite oxide composed of the metal or the metalloid and the lithium.

For the material containing the lithium used for such electrochemical reaction, there can be used, for example, the material capable of occluding or emitting lithium ion as used in the positive active material or the negative active material described hereinabove with respect to the prior art.

The occlusion of lithium ion into the monoxide MO of the metal or the metalloid by the electrochemical reaction can be achieved in the battery after assembling the battery, or inside or outside the battery depending on the battery producing process, which is described below.

More specifically, (1) the method is that monoxide composed of the metal or the metalloid or mixed composite agent composed of those described above and a conductive agent and a bonding agent are formed in a predetermined shape to produce one-side electrode (working electrode), while metal lithium or a material containing lithium is made the other-side electrode (counter electrode). These electrodes are opposingly arranged in contact with the non-aqueous electrolyte with lithium ion conductivity to produce an electrochemical cell, and hence the working electrode conducts or discharges a suitable current in the direction of cathode reaction to occlude the lithium ion electrochemically into the monoxide. The working electrode thus obtained is used as a negative electrode and/or positive electrode as it is or as an active material constituting the negative electrode and/or positive electrode to constitute the non-aqueous electrolyte secondary battery. (2) Monoxide composed of the metal or the metalloid, or composite agent composed of those described above, and a conductive agent and a bonding agent are formed into a predetermined shape, and lithium or alloy of lithium or the like is press fit or contact bonded to produce a laminated electrode, which is assembled into the non-aqueous electrolyte secondary battery as a negative electrode or as a positive electrode. The laminated electrode contacts with the electrolyte in the battery to form a kind of local battery and to produce self discharge, thus a method of electrochemically occluding lithium into the monoxide is provided. (3) Monoxide of the metal or the metalloid is made an active material of one-side electrode, and the other-side electrode is allowed to contain lithium to produce material capable of occluding and emitting lithium ion as an active material, thus such active materials constitute the non-aqueous electrolyte secondary battery. This is a method of occluding lithium ion into the monoxide by electrical charging or discharging while being used as a battery.

The materials thus obtained, the composite oxide $Li_xMO$ composed of the metals or the metalloids M other than alkali metals and lithium, are used as a negative and/or positive active material.

The electrodes using the composite oxide $Li_xMO$ can be used as an active material for the positive/negative electrodes to form the secondary battery, and moreover this can be used as either of a positive electrode or a negative electrode, and an electrode using various kinds of other negative active materials or positive active materials capable of occlusion and emission of the lithium or lithium ion can therefore be used as another electrode in combination therewith. In particular, the electrode using the composite oxide $Li_xMO$ as an active material according to the present invention has less deterioration due to excess charging and discharging in addition to a larger charge/discharge capacity of baser region where an electrode potential is equal to or less than 1.9 V relative to that of metal lithium. This therefore is used as a negative electrode to combine with the positive electrode using a high potential active material with an electrode potential equal to or more than 3 V or 4 V relative to the metal lithium such as metal oxides, $V_2O_5$, $Li_xCoO_2$, $Li_x NiO_2$, and $Li_xMn_2O_4$, and to more preferably obtain the secondary battery of a large current charging and discharging characteristic having a high voltage and a high energy density with less deterioration due to the excess charge and excess discharge. Among these, in the case where M forming the composite oxide $Li_xMO$ is Mn, Ti, Zn or metal or metalloid (Sn, Pb, Si, Ge) in Group 14 of the periodic table, this is considered superior as a negative active material because tile charging/discharging capacity of baser region with an electrode potential equal to or less than 1.5 V relative to metal lithium is greatly larger with less deterioration due to the excess charging/discharging.

While on the other hand, a negative electrode using the composite oxide $Li_xMO$ as a negative active material according to the invention is combined with a positive electrode using the composite oxide represented by composition formula of $Li_aT_bL_cO_2$ containing lithium with a layered structure as a positive active material, thus it is particularly preferable to obtain a long cycle life secondary battery of particularly high energy density having an upgraded charging/discharging characteristic with less deterioration due to the excess charge and excess discharge, where T represents transition metal element, L represents one or more metalloid element(s) selected from among boron B and silicon Si, a, b, and c satisfy $0<a<1.15$, $0.85<b+c<1.3$, and $0\leqq c$.

The composite oxide $Li_a$, $T_b$ $L_cO_2$ used as a positive active material of the battery according to the invention can be composed in an arrangement that each element, or each oxide or hydroxide, or salts such as carbonate or nitrate with respect to lithium Li, transition metal T and element L are mixed it a predetermined ratio, heated, and baked in the air or atmosphere containing oxygen at equal to or more than 600° C., preferably at 700° to 900° C. When, for a supply source of Li, T, and L, the oxide thereof or the compound thereof having oxygen is used, it is possible to heat and compose in an inert atmosphere. The amount of time for heating is ordinarily 4 to 50 hours which is enough to complete the treatment, however in order to promote the composition reaction axed to raise a uniformity, it is effective to repeat the processes of baking, cooling, and crushing and mixing several times.

In the composition formula $Li_aT_bL_cO_2$, the amount "a" of Li is standardized at a fixed composition ratio of a=1 in the heating and composing described above, however, a non-stoichiometric composition of an extent of ±15% is available, also $0<a<1.15$ is satisfied by electrochemical intercalation, deintercalation and the like.

For transition metal T, the Co, Ni, Fe, Mn, Cr, and V and the like are preferable, and in particular Co and Ni are more superior and preferable for the charging/discharging characteristic. For an amount "c" of boron and/or silicon and an amount "b" of transition metal T, a remarkable effect is preferably exhibited for polarization (internal resistance) reduction on charging and discharging and improvement of a cycle characteristic and the like under the condition of $0<c$ and $0.85<b+c<1.3$. On the other hand, the charge/discharge capacity at every cycle is lowered with an excess amount "c" of boron and/or silicon, and comes to maximum at $0<c<0.5$, whose ravage is particularly suitable.

The electrolyte may preferably be a non-aqueous electrolyte of lithium ion conductivity such as; organic electrolyte solution where a lithium ion dissociation salt such as $LiClO_4$, $LiPF_6$, $LiBF_4$, $LiCF_3SO_3$ as a supporting electrolyte are dissolved in single or mixed solvent of organic solvent such as γ-butyrolactone, propylene carbonate, ethylene carbonate, butylene carbonate, dimethyl carbonate, dicthyl carbonate, methylformate, 1, 2-dimethoxyethane, tetrahydrofuran, dioxolane, and dimethlylformamide; polymer solid electrolyte where the lithium salt is a solid soluted into polymer such as polyethylene oxide, polyphosphasen cross-linked substance or inorganic solid electrolyte such as $Li_3N$ and LiI etc. Particularly, the use of the nonaqueous electrolyte solution (organic electrolyte solution) containing ethylene carbonate as an organic solvent is preferred and provides a long cycle life secondary battery having a higher charge/discharge characteristic.

The electrodes using composite oxide $Li_x$ MO as an active material composed of metal or metalloid M other than alkali metals and lithium according to the present invention, can stably repeatedly occlude or emit lithium ion for an electrode potential at least ranging from 0 to 3 V relative to metal lithium in the non-aqueous electrolyte, and can be used, by such electrode reaction, as the negative electrode and/or positive electrode of the secondary battery capable of repeatedly charging and discharging. Since a high capacity region capable of stably occluding and emitting lithium ion and repeatedly charging and discharging is provided in a baser potential region of 0 to 1.9 V relative to a lithium reference electrode, then a higher performance can be realized in case of using as a negative electrode than in case of using as a positive electrode. In particular, when M is Mn, Ti, and Zn or metals or metalloids in Group 14 of the periodic table, a baser region with an electrode potential equal to or less than 1.5 V relative to metal lithium has a particularly larger charging/discharging capacity together with less deterioration due to excess charging and excess discharging, thereby providing a high grade of negative active material.

Compared to the conventional carbonaceous material such as graphite and the like which has been used for the electrodes of the battery of this kind, the amount of reversible occlusion and emission of lithium ion, that is, the charge and discharge capacity is considerably larger with less polarization of charging/discharging, therefore charging and discharging at a larger current is available, deterioration such as decomposition or crystal deintegration and the like due to the excess charging and excess discharging is hardly found, and thus an extremely stable battery with a long cycle life time can be obtained.

The reason why such a satisfactory charge/discharge characteristic can be obtained is not always clear, which however is estimated as mentioned below. The composite oxide $Li_x$ MO composed of the metals or the metalloid M other than alkali metals and lithium, has a higher mobility of lithium ion in such structure, and in addition, it is estimated that a considerably good amount of sites capable of occluding lithium ion are provided to facilitate occlusion and emission of the lithium ion.

On the other hand, the composite oxide $Li_aT_bK_cO_2$ used as a positive active material has an electrode potential equal to or more than about as high as 4 V relative to metal lithium, moreover reversible charging and discharging by intercalation and deintercalation of Li ion are available at least between $0 \leqq a < 1.15$, and thus an upgraded cycle characteristic can be obtained with less deterioration due to the excess charge and excess discharge. Particularly, a polarization is reduced in $0.05 \leqq c < 0.5$ for B and/or Si content "c" and resulting in a higher cycle characteristic. In this way, the reason why such a satisfactory charge/discharge characteristic can be obtained is not always clear, which however is estimated as mentioned below. The positive active material $Li_aT_bL_cO_2$ according to the present invention has a skeletal structure similar to a-$NaCrO_2$ type where a part of the transition metal element T of oxide $Li_aT_bL_cO_2$ with a layered structure of the a-$NaCrO_2$ type without containing B and Si is replaced by B or Si. However, B atoms and Si atoms are possible to reside in the interstices among lattices of the crystal or at Li sites (replaced by Li). In either of these cases, it is estimated that crystal structure and electron state are changed depending on the presence of B or Si, and Li ion comes to increase its conductivity and to facilitate occlusion and emission of the lithium ion.

For this reason, the battery, which is used by combining the negative active material with the positive active material according to the present invention, has a particularly upgraded performance in that, with a higher operating voltage of 4 to 2 V, the amount of reversible occlusion and emission of the lithium ion, i.e., the charging/discharging capacity, is considerably larger with less polarization on the charge and discharge, and thus larger current charging/discharging is available, moreover decomposition or crystal deintegration of the active material due to the excess charging and excess discharging are hardly found and an extremely stable long cycle service life is provided.

DETAILED DESCRIPTION OF THE PREFERRED EMBODIMENT

The present invention is described in more detail with reference to the following embodiments.

Figure 1:
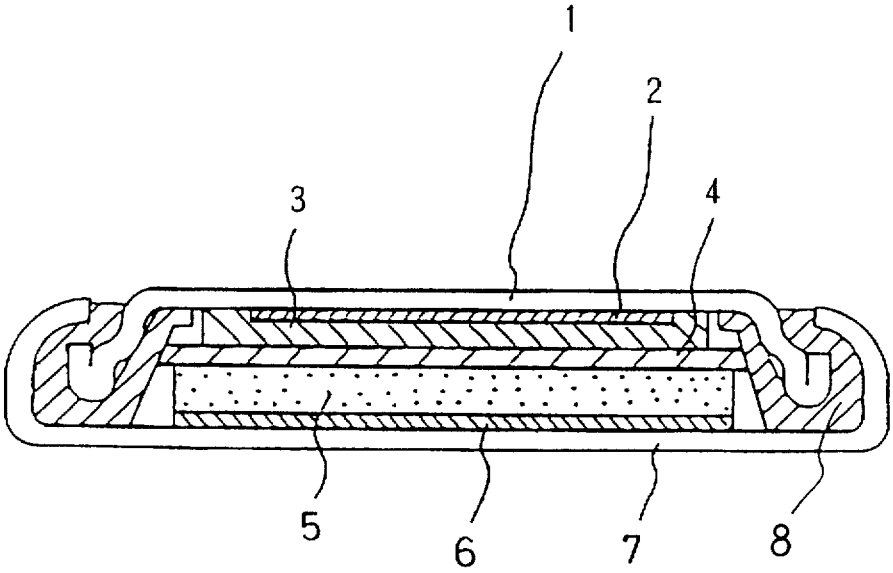
FIG. 1 is a view showing one example of a battery for comparison evaluation of an electrode active material in the present invention.

In the embodiments hereinafter described, FIG. 1 is a sectional view of a coin type battery showing one example of a test cell used for performance evaluation of an electrode active material of a non-aqueous electrolyte secondary battery according to the present invention. In the drawing, numeral 1 depicts a counter electrode casing simultaneously used as a counter electrode terminal and comprised at a stainless steel plate with Ni plating on its external side surface. Numeral 2 depicts a counter electrode collector composed of stainless steel net and spot welded to the counter electrode casing 1. A counter electrode 3 is formed at lithium foil having a predetermined thickness, which is punched at a diameter of 14 mm, and press fit on an aluminum plate with a predetermined thickness that is punched at a diameter of 15 mm and fixed on the counter electrode collector 2. 7 depicts a working electrode casing of stainless steel with its side surface Ni plated and which is simultaneously used as a working electrode terminal. 5 depicts a working electrode formed using an active material according to the invention described later or the comparison active material by the conventional method. 6 depicts a working electrode collector composed of a stainless steel net or a conductive bonding agent using carbon as a conductive filler, where the working electrode 5 and the working electrode casing 7 are electrically connected to each other. 4 depicts a separator formed of a porous film of polypropylene and which electrolyte solution is impregnated. 8 depicts a gasket mainly formed of polypropylene, which is arranged between the counter electrode casing 1 and the working electrode casing 7 to maintain electrical insulation between the counter electrode and the working electrode. An opening edge of the working electrode casing 7 is bent and caulked inside to tightly seal the contents of the battery. The battery has an outside diameter of 20 mm with a thickness of 1.6 mm.

(Embodiment 1)

The working electrode 5 of this embodiment is produced as described below. Iron monoxide FeO obtained in the market is crushed and granulated equal to or less than a particle diameter 53 μm by an automatic mortar to produce an active material "a" according to the invention, the resultant product is mixed with graphite as a conductive agent and a cross-linked type acrylic acid resin and the like as a binding agent in a weight ratio of 30:65:5 to obtain a working electrode composite agent. Next, the working electrode composite agent is press molded at 2 ton/cm$^2$ to a pellet having a diameter of 15 mm with a thickness of 0.5 mm together with the working electrode collector 6 formed of stainless steel net, thereafter depressured, heated, and dried during 10 hours at 200° C. thereby to produce a working electrode.

For comparison, the same electrodes (comparison working electrodes) are produced as in the case of the working electrode of the present invention described above with exception that the same graphite as used in the conductive agent described above is used as an active material (referred to as an active material "r1" for simplification) instead of the active material "a" according to the present invention.

Lithium perchlorate $LiClO_4$ is dissolved by 1 mol/l into a mixed solvent composed of propylene carbonate and 1, 2-dimethoxyethane with a volume ratio of 1:1 to produce electrolyte solution to be used.

The battery thus produced is aged at room temperature for a week, and then performed charging and discharging which are described later. This aging permits lithium–aluminum laminated electrodes of counter electrodes to contact with non-aqueous electrolyte solution within the battery to satisfactorily enable alloying, whereby the lithium foil is substantially all converted into li-Al alloy, and thus the battery voltage is reduced by about 0.4 V compared to the independent use of metal lithium as a counter electrode to become stable accordingly.

The batteries thus obtained are hereinafter referred to, for simplification, as "battery A" and "battery R1" in a corresponding manner to the active materials "a" and "r1" of the working electrodes respectively used therein.

Figure 2:
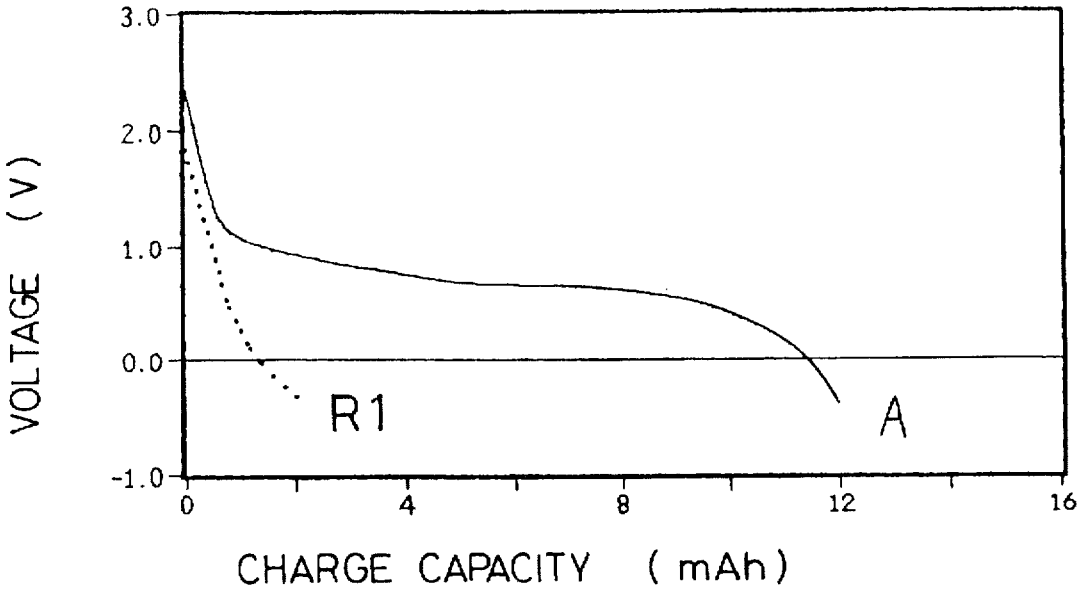
FIG. 2 is a graphical representation of a charging characteristic of active materials at the third cycle for comparison of a battery according to the present invention with the conventional battery.
Figure 3:
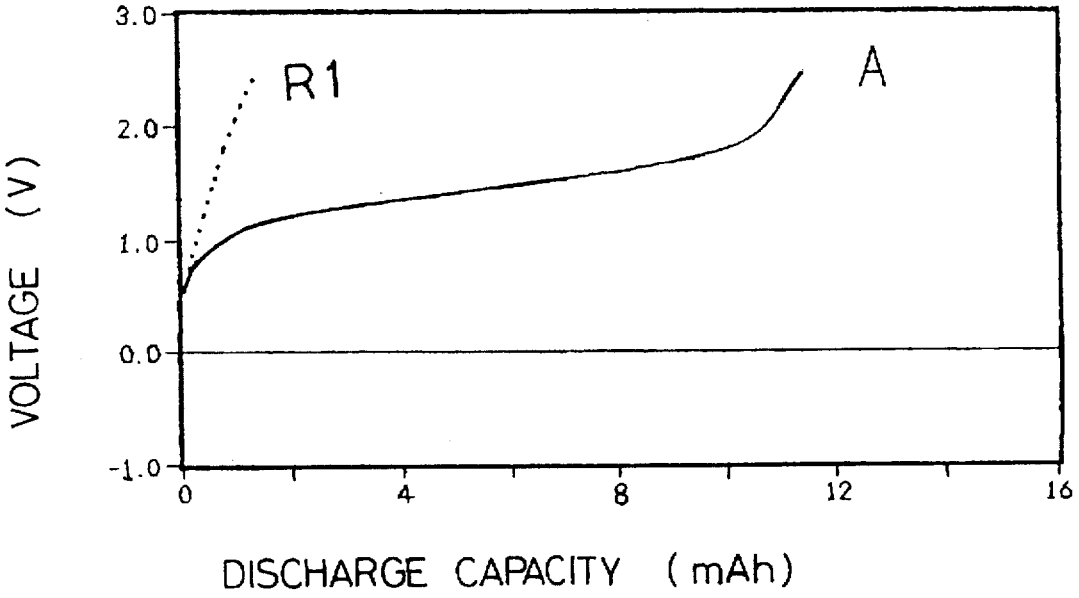
FIG. 3 is a graphical representation of a discharging characteristic of active materials at the third cycle for comparison of a battery according to the present invention with the conventional battery.
Figure 4:
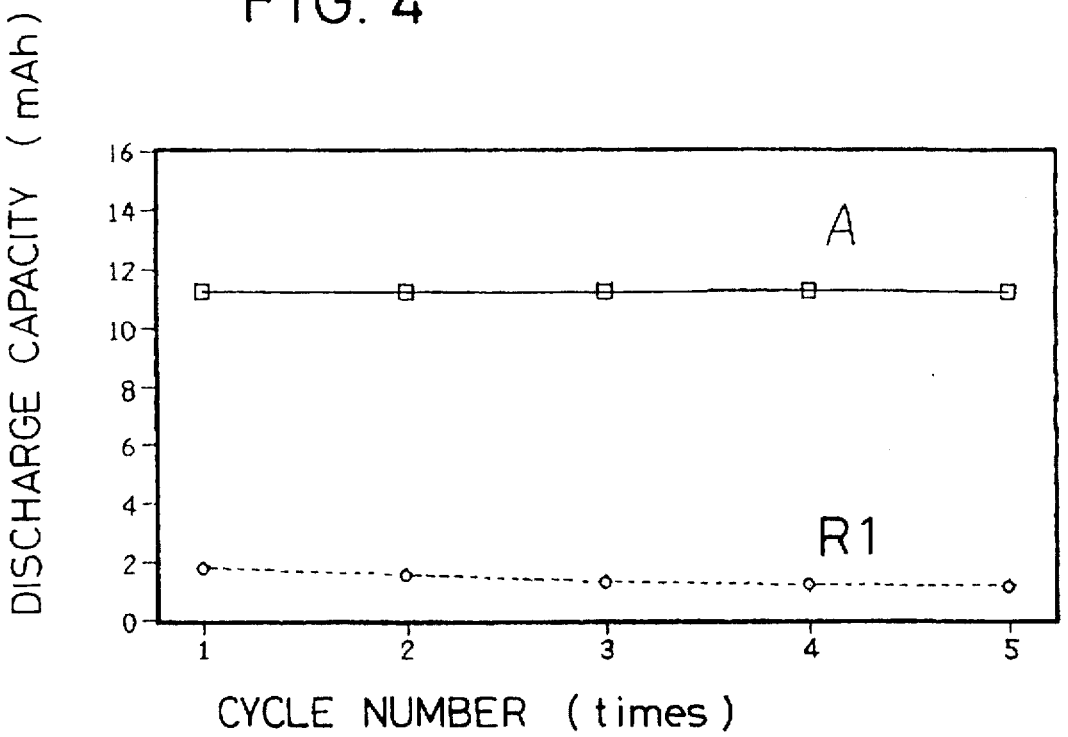
FIG. 4 is a graphical representation of a cycle characteristic of active materials for comparison of a battery according to the present invention with the conventional battery.

A charging characteristic and a discharging characteristic each for the third cycle are shown in FIG. 2 and FIG. 3 respectively under the condition when the batteries A and R1 are cycle charged and discharged at a constant current 0.4 mA with a final voltage −0.4 V of charging (in the current direction of battery reaction where lithium ion is occluded into the working electrode from inside the electrolyte) and a final voltage 2.5 V of discharging (in the current direction of battery reaction where lithium ion is emitted to the electrolyte from the working electrode). A cycle characteristic is shown in FIG. 4. The charging/discharging cycle starts from charging. As is apparent from FIGS. 2 to 4, the battery A of the invention has a considerably larger charge/discharge capacity compared to the comparison battery R1 to remarkably enlarge the reversible region of charge/discharge. The discharge capacity reduction (cycle deterioration) due to repeated charge and discharge is almost prevented together with an extremely reduced difference of operational voltage between the charge and the discharge over the entire charge/discharge region, thus the battery polarization (internal resistance) is considerably small to facilitate the large current charging and discharging.

(Embodiment 2)

Instead of the active material "a" in the embodiment 1, silicon monoxide SiO with a purity degree of 99.9% obtained in the market is crushed and granulated at a particle size equal to or less than 53 μm to produce an active material of the working electrode (an active material "b" according to the present invention)to be used. A battery B is produced in the same manner as in the battery A of the embodiment 1 other than the working electrode active material described above.

Figure 5:
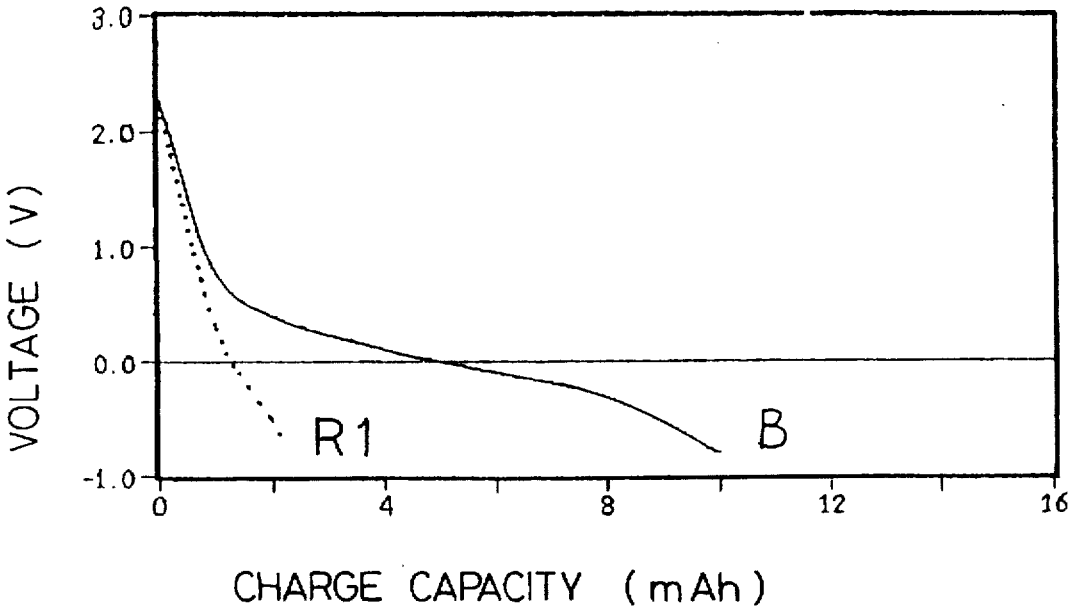
FIG. 5 is a graphical representation of a charging characteristic of active materials at the third cycle for comparison of a battery according to the present invention with the conventional battery.
Figure 6:
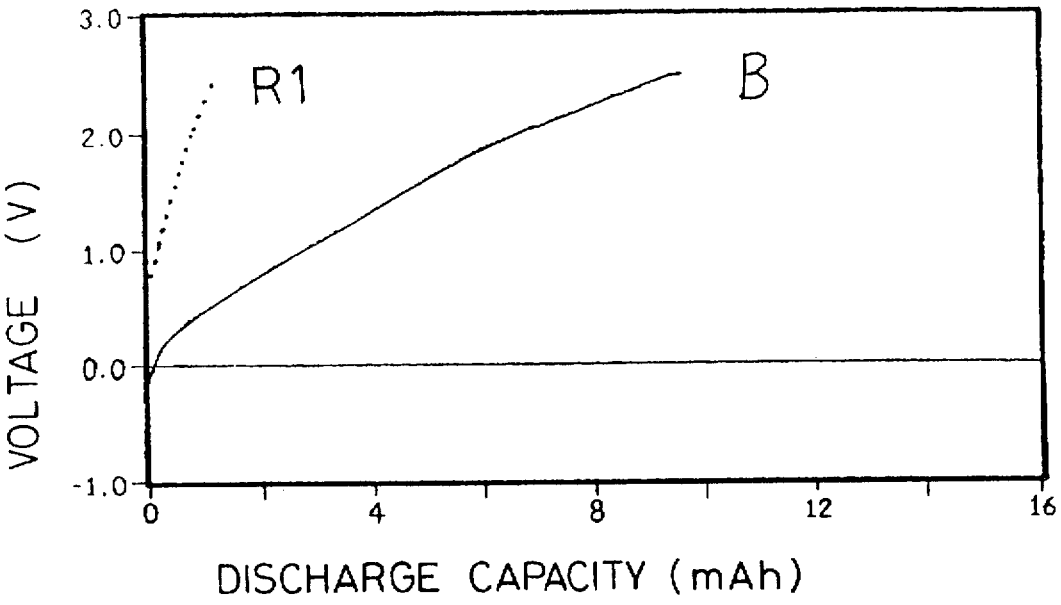
FIG. 6 is a graphical representation of a discharging characteristic of active materials at the third cycle for comparison of a battery according to the present invention with the conventional battery.
Figure 7:
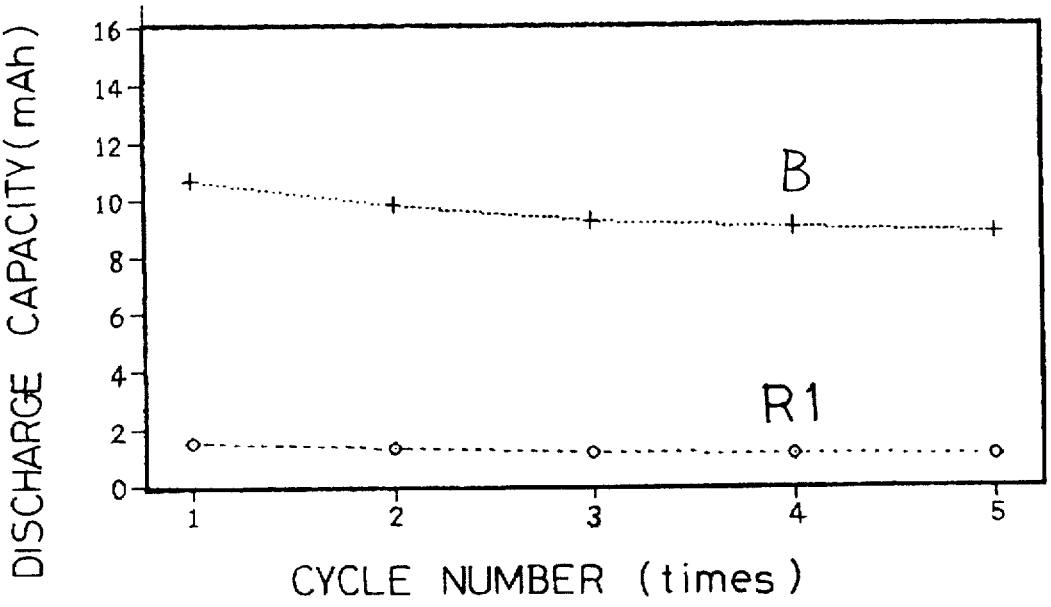
FIG. 7 is a graphical representation of a cycle characteristic of active materials for comparison of a battery according to the present invention with the conventional battery.

A charging/discharging cycle test is performed for the battery B thus obtained and the comparison battery R1 described above under the condition of a constant current of 0.4 mA with a final charging voltage of −0.8 V and a final charging voltage of 2.5 V. The charging characteristic and discharging characteristic each for the third cycle at that time are shown in FIGS. 5 and 6 respectively. A cycle characteristic is shown in FIG. 7.

As is apparent from the drawings, the battery B of this embodiment is found to have a high grade of charging/discharging characteristic as in the battery A of the embodiment 1 according to the invention.

(Embodiment 3)

This embodiment uses LixMnO as an active material. The same battery as in the embodiment 1 is produced with exception that a working electrode and electrolyte solution as described below are used instead of the working electrode and electrolyte solution in the embodiment 1, and 1.6 times of the lithium amount is used for a counter electrode 3.

A working electrode 5 is produced as follows. Manganese monoxide MnO obtained in the market is crushed and granulated at a particle size of equal to or less than 53 μm by the automatic mortar to produce an active material "c" of the invention, which is mixed of the same graphite as used in the embodiment 1 as a conductive agent and of cross-linked type acrylic acid resin and the like as a binding agent at a weight ratio of 65:20:15 to produce a working electrode composite agent. Next, this working electrode composite agent is pressed and molded at 2 ton/cm$^2$ on a pellet having a diameter 15 mm with a thickness of 0.3 mm to produce the working electrode 5. The working electrode 5 thus obtained is then contact fit into a unitary shape with a working casing 7 by a working electrode collector 6 composed of a conductive resin bonding agent using carbon as a conductive filler, and thereafter the resultant product is depressured, heated, and dried for 10 hours at 200° C. and used to produce a coin shaped battery as formerly described.

For comparison, the same electrode (comparison working electrode) is produced as in the case of the working electrode of the invention described above with exception that the same graphite used for the conductive agent as described is used as an active material (referred to as an "active material r2" for simplification) instead of the active material "c" of the invention described above.

Lithium perchlorate $LiClO_4$ is dissolved by 1 mol/l into mixed solvent of propylene carbonate and ethylene carbonate and 1, 2-dimethoxyethane at a volume ratio of 1:1:2 to produce electrolyte to be used.

The battery thus produced is placed and aged for a week at room temperature, and then the charge/discharge test is performed, which is described later. This aging enables lithium–aluminum laminated electrodes of counter electrodes to contact with non-aqueous electrolyte solution within the battery to satisfactorily achieve alloying, and thus the lithium foil is all substantially changed into Li-Al alloy, and a battery voltage is decreased by about 0.4 V, which is stable, compared to the independent use of metal lithium as a counter electrode.

The batteries thus made up are hereinafter referred to as batteries C and R2 for simplification in a corresponding manner to the respectively used active materials "c" and "r2" of the working electrodes.

Figure 8:
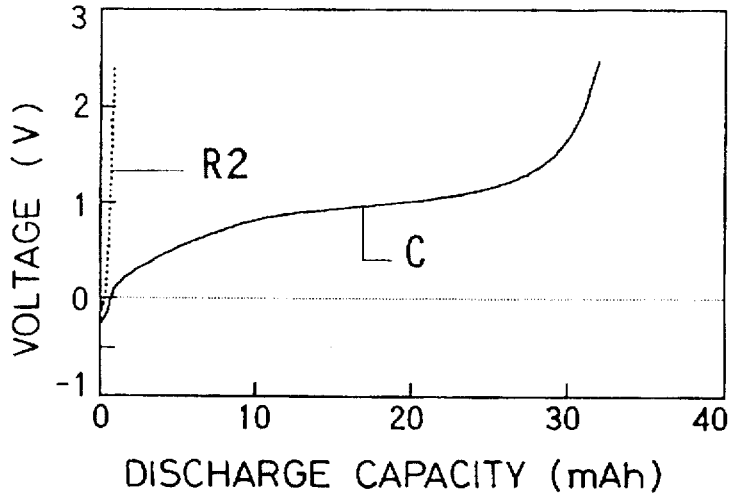
FIG. 8 is a graphical representation of a discharging characteristic of active materials at the third cycle for comparison of a battery according to the present invention with the conventional battery.
Figure 9:
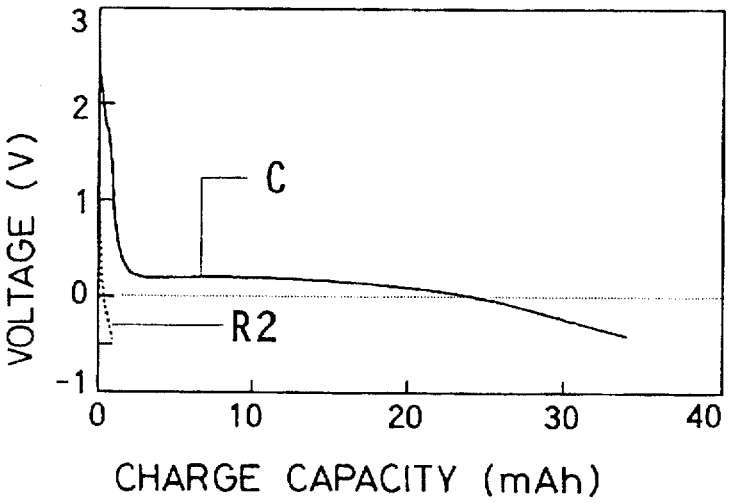
FIG. 9 is a graphical representation of a charging characteristic of active materials at the third cycle for comparison of a battery according to the present invention with the conventional battery.
Figure 10:
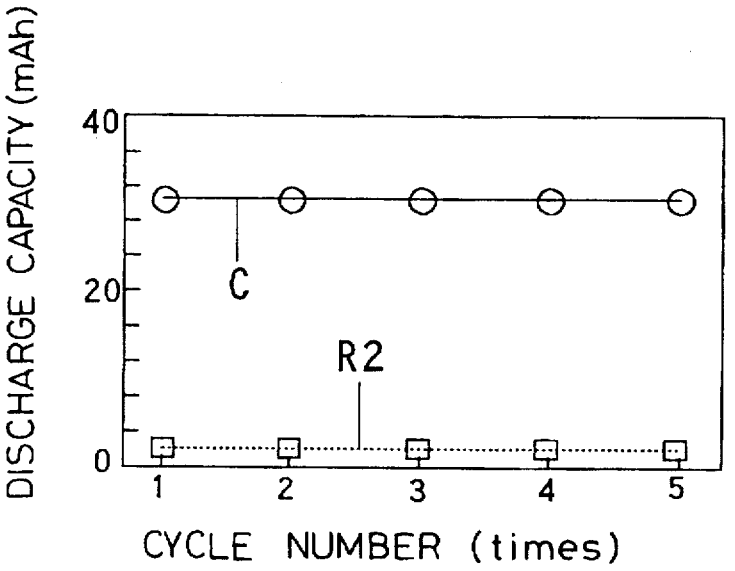
FIG. 10 is a graphical representation of a cycle characteristic of active materials for comparison of a battery according to the present invention with the conventional battery.

FIGS. 8 and 9 show a discharging characteristic and charging characteristic each of the third cycle when the these batteries C and R2 are cycle charged and discharged at a constant current of 1 mA with a final voltage −0.4 V of charging (in the current direction of battery reaction where lithium ion is occluded into the working electrode from the electrolyte solution) and a final voltage 2.5 V of discharging (in the current direction of battery reaction where lithium ion is emitted to the electrolyte solution from the working electrode). The cycle characteristic is shown in FIG. 10. The charging and discharging cycle starts from the charging. As is apparent from FIG. 8 to 10, the battery C according to the present invention has a relatively larger charge/discharge capacity compared to the comparison battery R2 to considerably enlarge the reversible region of charge/discharge. The discharge capacity reduction (cycle deterioration) due to repeated charge and discharge is almost prevented together with an extremely reduced difference of operational voltage between the charge and the discharge over the entire charge/discharge region, and thus the battery polarization (internal resistance) is considerably small and this facilitates the large current charging and discharging.

(Embodiment 4)

Instead of the active material "c" in the embodiment 3, titanium monoxide TiO obtained in the market is crushed and granulated at a particle size equal to or less than 53 μm to produce an active material for the working electrode (an active material "d" according to the present invention) to be used. A battery D is produced in the same manner is in the battery C of the embodiment 3 other than this working electrode active material described above.

Figure 11:
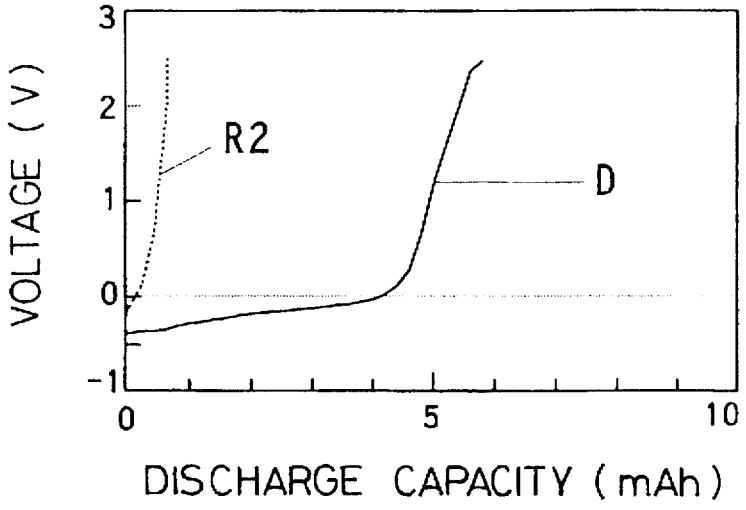
FIG. 11 is a graphical representation of a discharging characteristic of active materials at the third cycle for comparison of a battery according to the present invention with the conventional battery.
Figure 12:
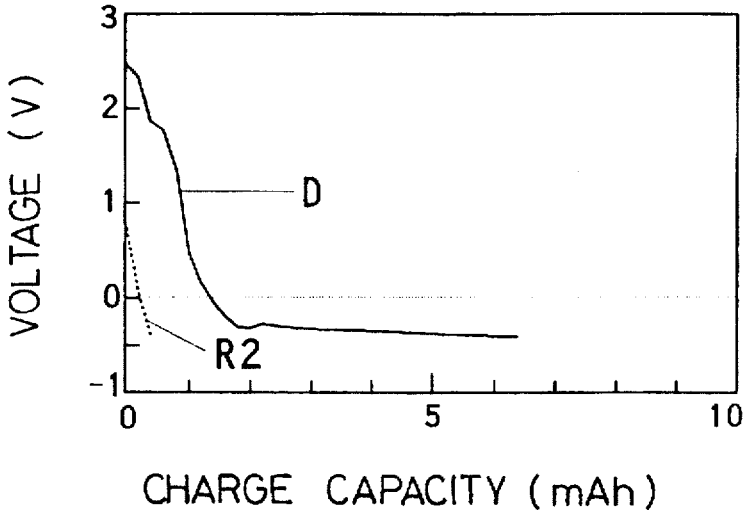
FIG. 12 is a graphical representation of a charging characteristic of active materials at the third cycle for comparison of a battery according to the present invention with the conventional battery.
Figure 13:
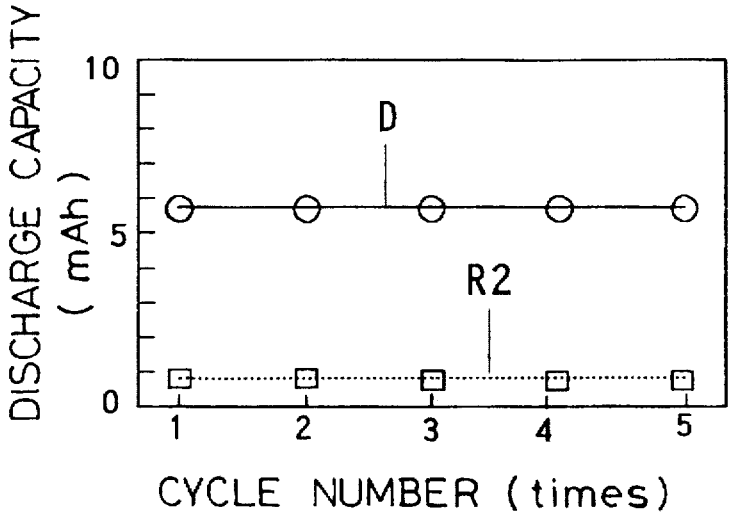
FIG. 13 is a graphical representation of a cycle characteristic of active materials for comparison of a battery according to the present invention with the conventional battery.

A charging/discharging cycle test is performed as in the embodiment 3 for the battery D thus obtained and the comparison battery R2 described above under the condition of a constant current of 1 mA with a final charging voltage of −0.4 V and a final discharging voltage of 2.5 V. The discharging characteristic and charging characteristic each for the third cycle at that time are shown in FIGS. 11 and 12 respectively. A cycle characteristic is shown in FIG. 13.

As is apparent from the drawings, the battery D of this embodiment is found to have a high grade of charging/discharging characteristic as in the batteries A, B, C of the embodiments 1, 2, 3 according to the invention.

(Embodiment 5)

Zinc monoxide ZnO obtained in the market is crushed and granulated at a particle size equal to or less than 53 μm to produce an active material of the working electrode (an active material "e" according to the invention) to be used.

Figure 14:
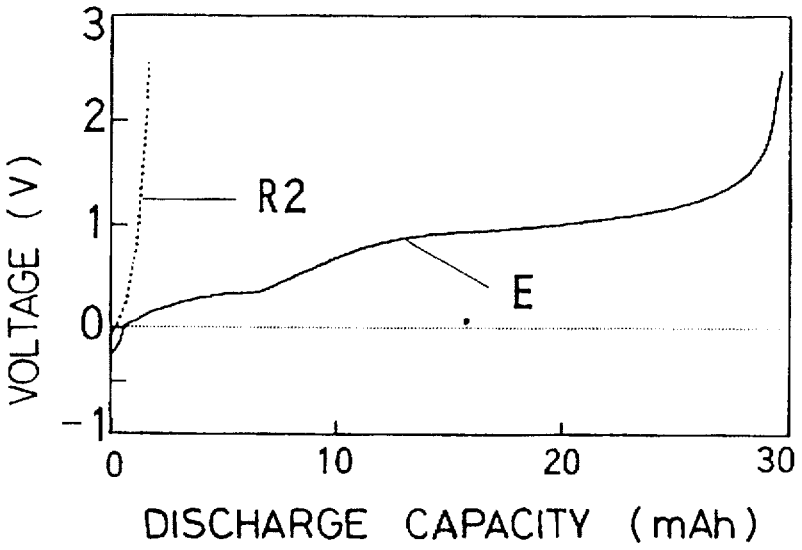
FIG. 14 is a graphical representation of a discharging characteristic of active materials at the first cycle for comparison of a battery according to the present invention with the conventional battery.
Figure 15:
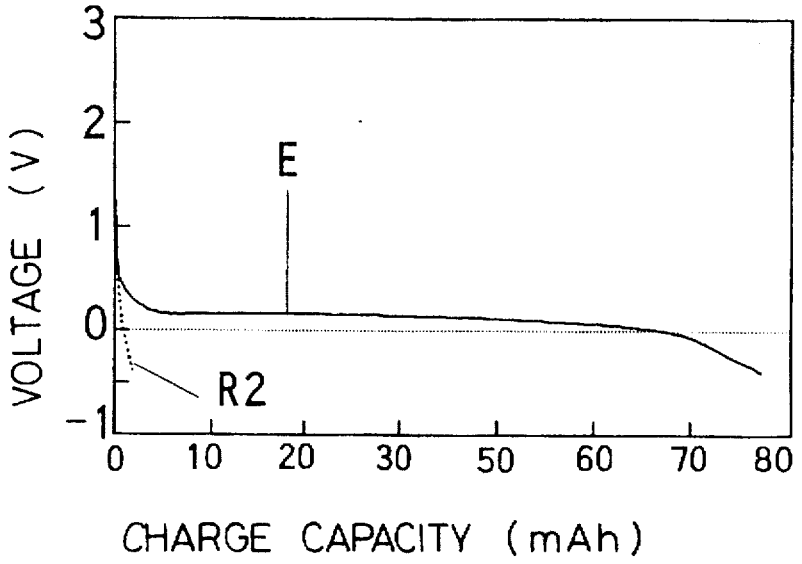
FIG. 15 is a graphical representation of a charging characteristic of active materials at the first cycle for comparison of a battery according to the present invention with the conventional battery.

A battery E is produced in the same manner as in the battery C of the embodiment 3 other than this working electrode active material described above. A charging/discharging cycle test is performed as in the embodiment 3 for the battery E thus obtained and the comparison battery R2 described above under the condition of a constant current of 1 mA with a final charging voltage of −0.4 V and a final discharging voltage of 2.5 V. The discharging characteristic and charging characteristic each for the first cycle at that Lime are shown respectively in FIGS. 14 and 15.

As is apparent from the drawings, the battery E of this embodiment is found to have a high grade of charging/discharging characteristic as in the batteries A to D of the embodiments 1 to 4 according to the invention. The battery E according to the present invention is found to have a considerably larger charge/discharge capacity compared the comparison battery R2 to greatly enlarge the reversible region of charge/discharge. A difference of operational voltage between the charge and the discharge is remarkably reduced over the entire charge/discharge region, and thus the battery polarization (internal resistance) is considerably small, and this facilitates the large current charging and discharging.

(Embodiment 6)

Tin monoxide SnO obtained in the market is crushed and granulated at a particle size equal to or less than 53 μm to produce an active material of the working electrode (an active material "f" according to the invention) to be used.

A battery F is produced in the same manner as in the battery C of the embodiment 3 other than this working electrode active material described above. A charging/discharging cycle test is performed as in the embodiment 3 for the thus obtained battery F under the condition of a constant current of 1 mA with a final charging voltage of −0.4 V and a final discharging voltage of 2.5 V. The discharging characteristic and charging characteristic each for the third cycle at that time are shown respectively in FIGS. 16 and 17. The cycle characteristic is shown in FIG. 18.

Figure 16:
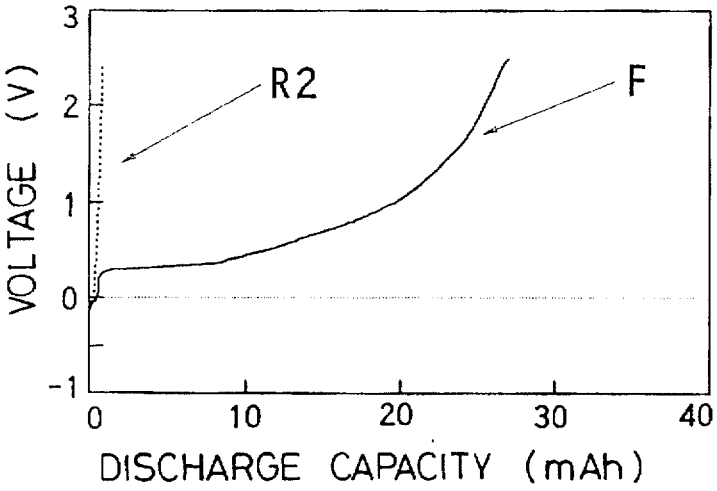
FIG. 16 is a graphical representation of a discharging characteristic of active materials at the third cycle for comparison of a battery according to the present invention with the conventional battery.
Figure 17:
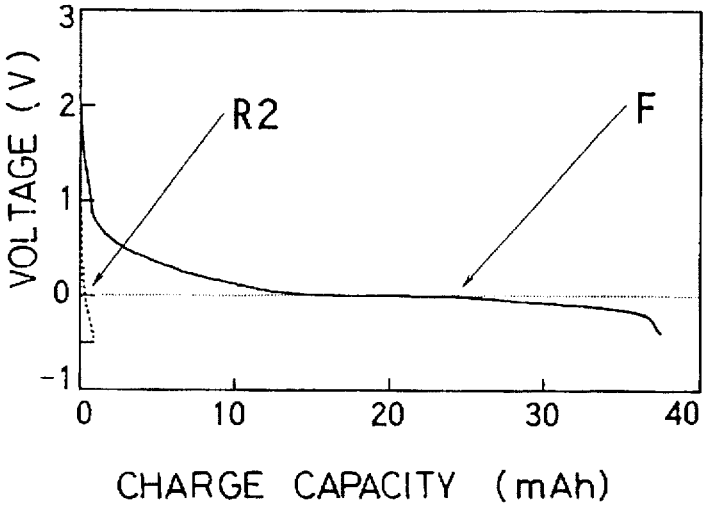
FIG. 17 is a graphical representation of a charging characteristic of active materials at the third cycle for comparison of a battery according to the present invention with the conventional battery.
Figure 18:
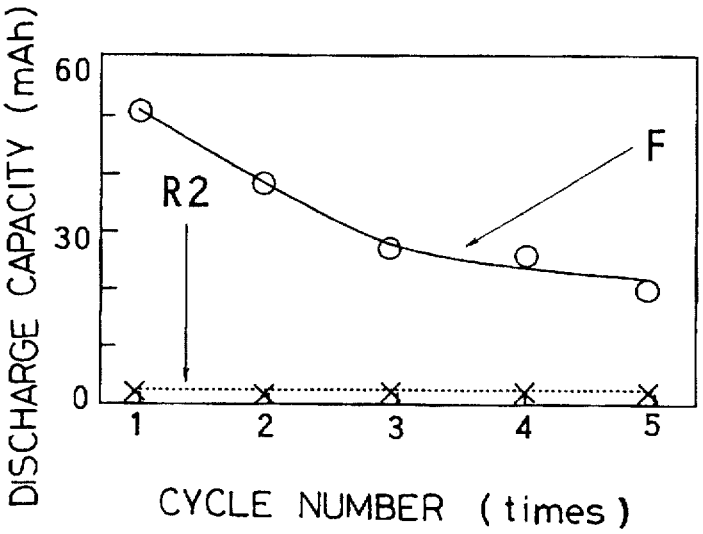
FIG. 18 is a graphical representation of a cycle characteristic of active materials for comparison of a battery according to the present invention with the conventional battery.

As is apparent from FIGS. 16 to 18, the battery F according to the present invention is found to have a considerably larger charging/discharging capacity compared to the comparison battery R2 as in the battery C of the embodiment 3 to greatly enlarge the reversible region of charge/discharge. A difference of operational voltage between the charge and the discharge is considerably reduced over the entire charge/discharge region, and thus the battery polarization (internal resistance) is remarkably reduced, which facilitates the large current charging and discharging.

In the embodiments as hereinbefore described, the batteries A to F according to the present invention have active materials "a" to "f" of the working electrodes to produce composite oxide $Li_xMO$ (M represents Fe, Si, Mn, Ti, Zn and Sn) containing lithium by the first charging. Due to such charging, lithium ion, which is emitted into the electrolyte from the Li–Al alloy of the counter electrode, moves through the electrolyte to electrode-react with the active material MO of the working electrode, and thus the lithium ion is electrochemically occluded into the active material MO to produce the composite oxide $Li_x$ MO containing lithium. Next, on discharging, the lithium ion is emitted into the electrolyte from the composite oxide to move through the electrolyte and to be occluded into the Li–Al alloy of the counter electrode, whereby stably repeated charging/discharging are available. The active materials "a" to "f" (MO) produce the composite oxide $Li_x$ MO containing lithium by the first charging, and thereafter in charging–discharging cycles also form the composite oxide $Li_x$ MO containing lithium other than at the time of bring completely discharged.

It is found that the active materials "a" to "f" of the batteries A to F according to the present invention are not only used as a positive active material of the nonaqueous electrolyte secondary battery but also exhibit a high grade property as a negative active material because a charge/discharge capacity of a baser potential region of −0.4 to +1.5 V (corresponding to about 0 to 1.9 V for metal lithium) is equal to or more than that of a nobler potential region of 1.5 to 2.5 V (corresponding to about 1.9 to 2.9 V for metal lithium) with respect to the Li–Al alloy electrode. Particularly, the active material $Li_x$ MO of the embodiments 2 to 6 (where M represents Mn, Ti, Zn, or metal Sn or metalloid Si in periodic table 14 group) has a larger charge/discharge capacity in the baser potential region of −0.4 to +1.1 V (corresponding to about 0 to 1.5 V for metal lithium) with respect to the Li–Al alloy electrode, and in addition, has a more baser potential, and is superior as a negative active material.

(Embodiment 7)

Figure 19:
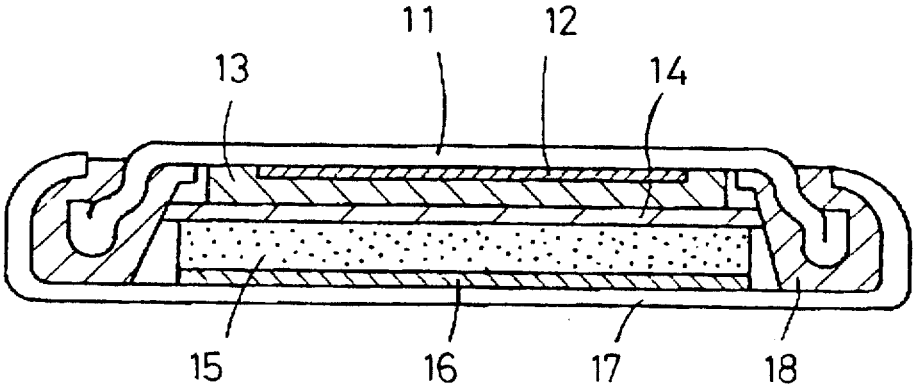
FIG. 19 is a view showing one example of a battery of an embodiment in the present invention.

FIG. 19 is a sectional view of a coin type battery showing one example of a non-aqueous electrolyte secondary battery according to the present invention. In the drawing, 11 depicts a negative electrode casing simultaneously used is a negative electrode terminal, and which comprises a stainless steel plate with its outer side surface Ni plated. 13 depicts a negative electrode formed using a negative active material according to the present invention which is described later, the negative electrode being fixed on a negative electrode casing at by a negative electrode collector 12 composed of a conductive bonding agent using carbon as a conductive filler. Numeral 17 is a positive electrode casing made of stainless steel with its outer side surface Ni plated, and is simultaneously used as a positive electrode terminal. 15 is a positive electrode composed of the positive active material of the invention described later, and is fixed on the positive electrode casing 17 by a positive electrode collector 16 formed of the conductive bonding agent using carbon as a conductive filler. 14 is a separator formed of a porous film of polypropylene, and is impregnated with electrolyte solution. 18 is a gasket mainly made of polylpropylene, which is disposed between the negative electrode casing 11 and the positive electrode casing 17 to maintain an electrical insulation between the negative electrode and the positive electrode, and in which the positive electrode casing has an opening with an edge that is bent and caulked inside to tightly seal the contents of the battery. For the electrolyte solution, lithium perchlorate $LiClO_4$ is dissolved by 1 mol/l into mixed solvent at a volume ratio of 1:1:2 of propylene carbonate, ethylene carbonate and 1, 2-dimethoxyethane to produce the electrolyte solution to be used. The battery has a size of outside diameter at 20 mm with a thickness of 1.6 mm.

The negative electrode 13 is produced as follows. Manganese monoxide MnO with a purity degree of 99.9% obtained in the market is crushed and granulated at a particle size equal to or less than 53 μm by the automatic mortar to produce a negative electrode active material according to the invention, which is mixed with graphite as a conductive agent and a cross-linked type acrylic acid resin and the like as a binding agent at a weight ratio of 65:20:15 to produce a negative electrode composite agent, which is next press molded at a weight of 2 ton/cm$^2$ to a pellet having a diameter of 15 mm with a thickness of 0.23 mm, thereafter is depressured, heated, and dried at 200 ° C. for 10 hours to produce a negative electrode.

The positive electrode 15 is produced as follows. Lithium hydroxide $LiOH.H_2O$ and cobalt carbonate $CoCO_3$ are weighed to obtain a mol ratio of Li:Co of 1:1 and sufficiently mixed using a mortar, the resultant mixture is heated and baked at a temperature of 850 ° C. in the atmosphere for 12 hours, and after cooling, crushed and granulated at a particle size equal to or less than 53 μm. The baking, crushing, and granulating are repeated two times to compose the positive active material $LiCoO_2$ according to the present invention.

This product material is made as a positive active material, which is mixed with graphite as a conductive agent and fluorine resin and the like as a binding agent at a weight ratio of 80:15:5 to produce a positive electrode composite agent, which next is pressed and molded at 2 ton/cm$^2$ on a pellet having a diameter of 16.2 mm with a thickness of 0.67 mm, thereafter is depressured, heated, and dried at 100° C. for 10 hours to produce a positive electrode.

The battery (referred to as a battery G) thus made-up is aged at room temperature for a week, and then the charge/discharge test is performed, which is described later.

Figure 20:
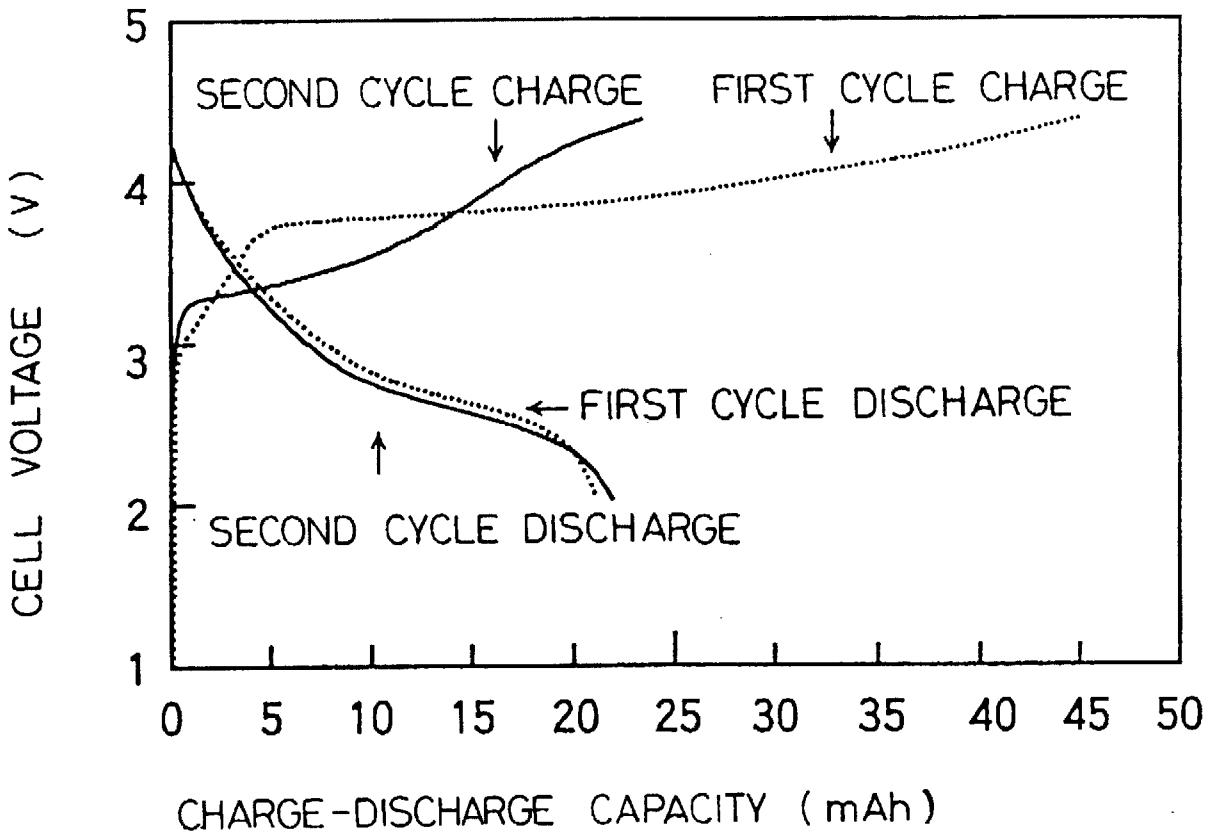
FIG. 20 is a graphical representation showing a charging and discharging characteristic at the first cycle and the second cycle of a battery according to the present invention.
Figure 21:
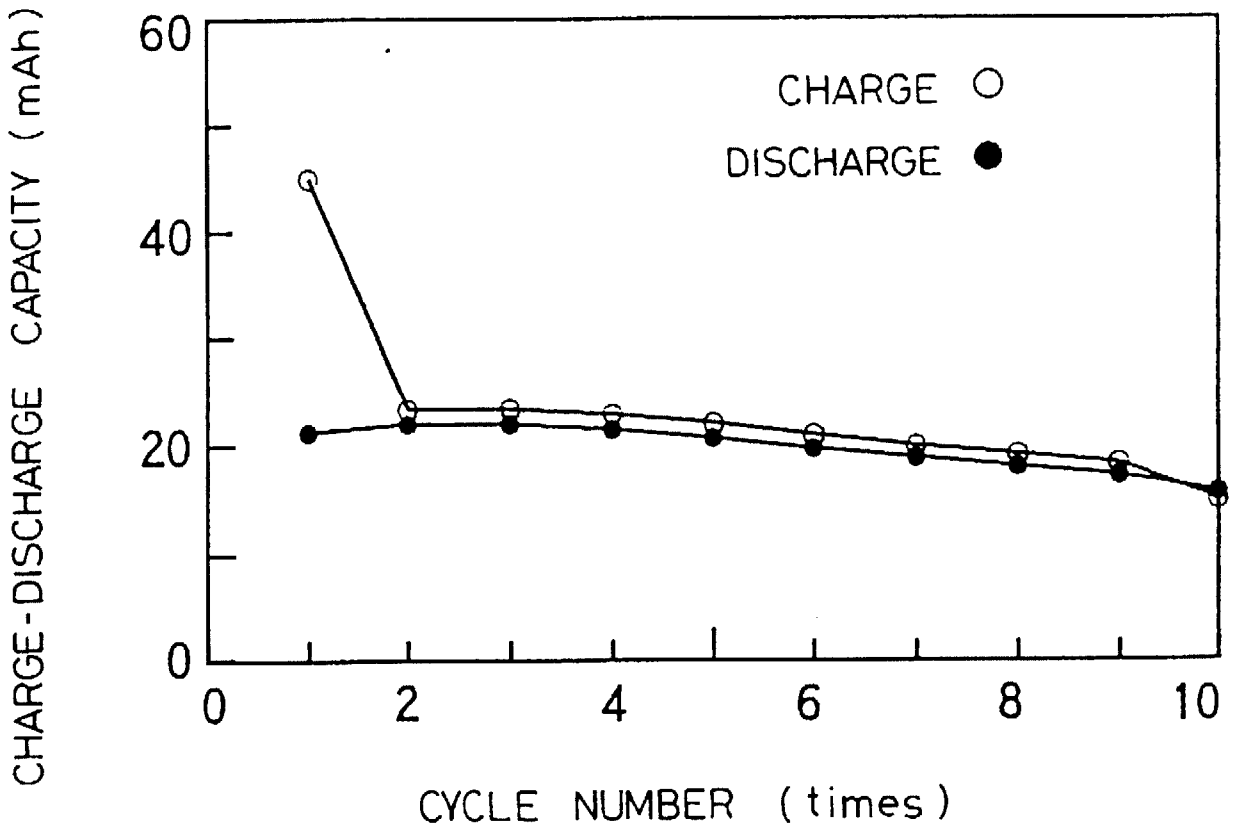
FIG. 21 is a graphical representation showing a cycle characteristic of a battery according to the present invention.

FIG. 20 shows a charge/discharge characteristic of the first cycle and second cycle when the battery G is cycle charged and discharged at a constant current 1 mA under the condition of a final charging voltage of 4.4 V and final discharging voltage of 2.0 V, and FIG. 21 shows a cycle characteristic. The charge and discharge cycle starts from charging.

The battery G, which emits lithium ion into the electrolyte solution from the positive active material $LiCoO_2$ by charging, causes the lithium ion to move through the electrolyte solution and to electrode-react with the negative active material, and thus the lithium ion is electrochemically occluded into the negative active material to produce lithium manganese composite oxide $Li_xMnO$ containing lithium. Next, on discharging, lithium ion is emitted into the electrolyte solution from the lithium manganese composite oxide of negative electrode to move through the electrolyte solution and to be occluded into the positive active material, thus stable repeated charging and discharging becomes possible. Here, the negative active material produces the composite oxide $Li_{x-1}MnO$ containing lithium by the first charging, thereafter in the charging/discharging cycle, the composite oxide $Li_xMnO$ containing lithium is formed other than at the time of being completely discharged.

As is apparent from FIGS. 20 and 21, the battery G according to the present invention has a considerably larger charge/discharge capacity. The discharging capacity relative to the charging capacity (charging/discharging efficiency) is hardly decreased other than at the first cycle together with the small decrease of the discharging capacity (cycle deterioration) due to repeated charging/discharging. In addition, it is found that a difference of operational voltage between the charging and the discharging over the entire charge/discharge region is considerably small with an extremely reduced polarization (internal resistance) of the battery to facilitate a larger current charging/discharging.

The reason why there arises considerable decrease of the discharging capacity (initial loss) at the first cycle relative to the charging capacity at the first cycle resides in a side reaction as a main cause generated between the graphite as a conductive agent or a binding agent added to the negative composite agent and Li when lithium ion is electrochemically occluded into the negative active material at the first cycle charging, and such reason is also considered due to the presence of remaining Li which is occluded into MnO of the negative active material but is not emitted at the time of discharging.

(Embodiment 8)

A battery H is produced in the same manner as in the embodiment 7 with exception that a negative electrode 23 and a positive electrode 25 produced as described below are used instead of the negative electrode 13 and the positive electrode 15 of the embodiment 7.

The negative electrode 23 is produced as the following. A negative active material and a negative composite agent as in the embodiment 7 are used to press and mold at 2 ton/cm$^2$ on a pellet having a diameter of 15 mm with a thickness of 0.33 mm to produce a negative electrode pellet. The negative electrode pellet, which is fixed on a negative electrode casing 11 by a negative electrode collector 12 composed of the conductive bonding agent using carbon as a conductive filler, is depressured, heated, and dried at 200° C. for 10 hours, thereafter a lithium foil with a predetermined thickness, which is punched at a diameter of 14 mm, is press fit on the negative electrode pellet. The lithium–negative electrode pellet laminated electrode thus obtained is used as a negative electrode.

The positive electrode 25 is produced as described below. Lithium hydroxide $LiOH.H_2O$, cobalt carbonate $CoCO_3$ and boron oxide $B_2O_3$, are weighed for a ratio of Li:Co:B of 1:0.9:0.1 to be mixed sufficiently by the mortar, thereafter the mixture is heated and baked at the atmosphere of 850° C. for 12 hours, and after cooling, crushed and granulated into particles with a diameter equal to or less than 53 82 m. The two times of baking, crushing, and granulating provide positive active material $LiCo_{0.9}B_{0.1}O_2$ according to the present invention.

The product material described above as a positive active material is mixed with graphite as a conductive agent and fluorine resin and the like as a binding agent at a weight ratio of 80:15:5 to produce a positive electrode composite agent, which is press molded at 2 ton/cm$^2$ on a pellet having a diameter of 16.2 mm with a thickness of 0.47 mm, and then the resultant product is depressured, heated, and dried at 100° C. for 10 hours to obtain a positive electrode.

The battery thus obtained (hereinafter referred to as a battery H for simplification) is aged at room temperature for a week and then the charging/discharging test is performed, which is described later. The aging causes lithium–negative electrode pellet laminated electrode of the negative electrode 23 to contact with the nonaqueous electrolyte solution within the battery and to spontaneously electrochemically react, whereby lithium foil is electrochemically occluded substantially completely into the negative electrode composite agent.

Figure 22:
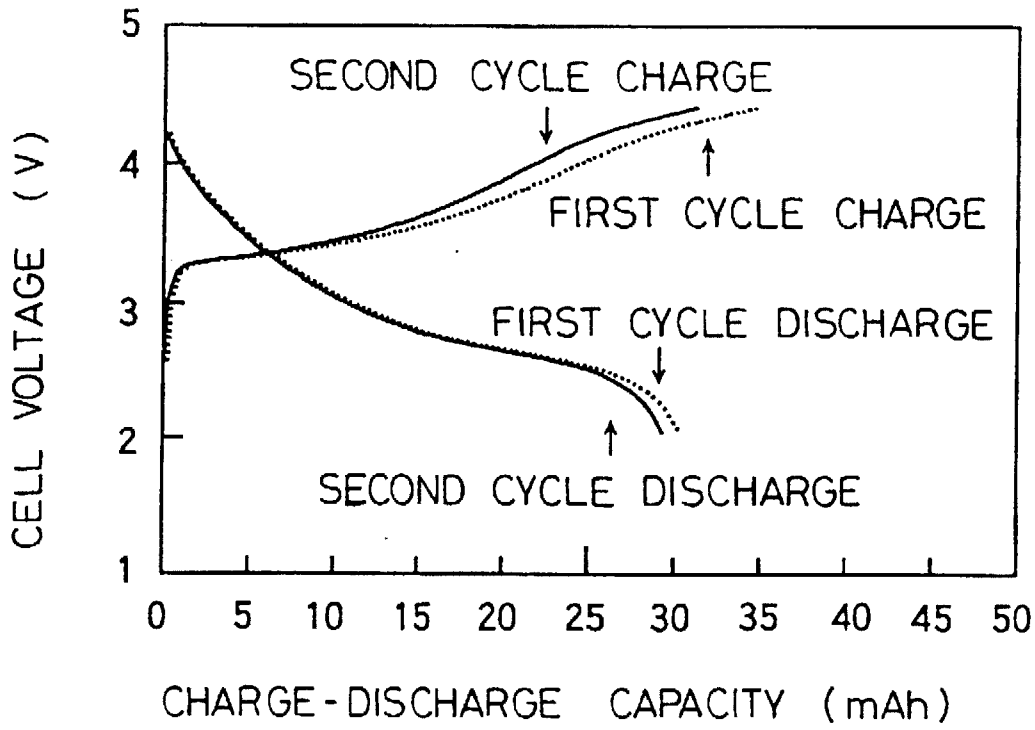
FIG. 22 is a graphical representation showing a charging and discharging characteristic at the first cycle and the second cycle of a battery according to the present invention.
Figure 23:
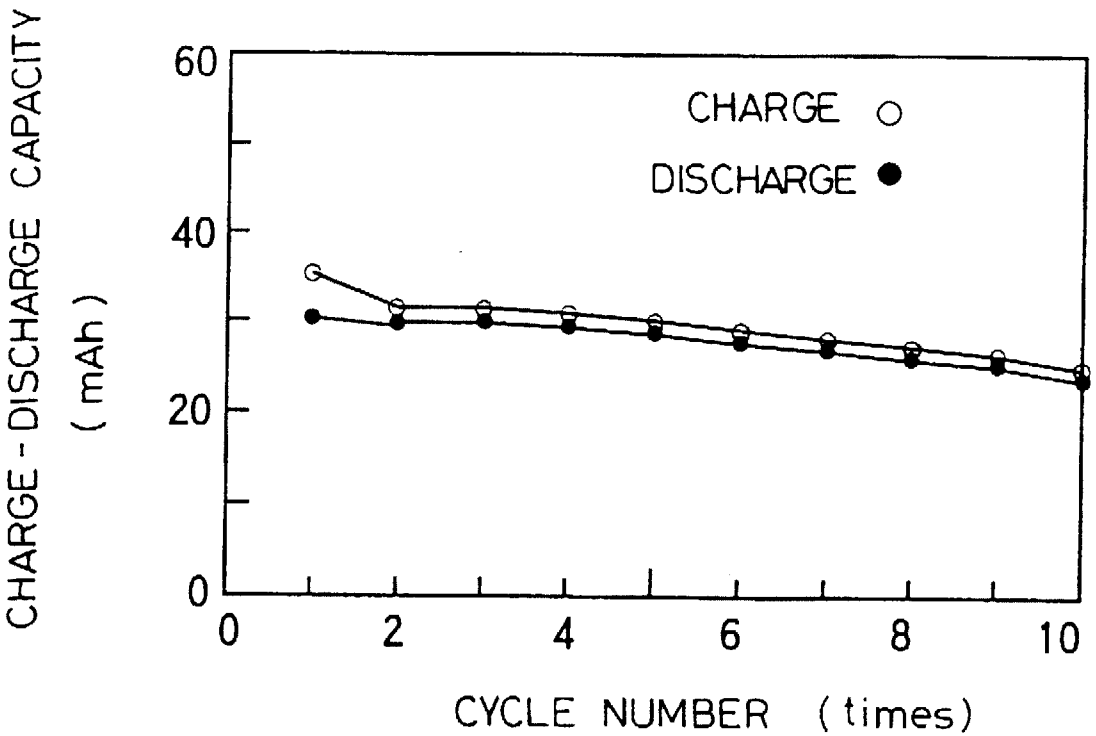
FIG. 23 is a graphical representation showing a cycle characteristic of a battery according to the present invention.

The battery H thus obtained is performed of the charging/discharging cycle test at a constant current 1 mA as in the embodiment 7 under the condition of a final charging voltage of 4.4 V and a final discharging voltage of 2.0 V. The charging/discharging characteristics at the first cycle and second cycle are shown in FIG. 22, and the cycle characteristic is shown in FIG. 23.

As is apparent from the drawing, the battery H of this embodiment is found to have a considerably superior charging/discharging characteristic compared to that of the battery G of the embodiment 7. In particular, a notable improvement compared to the battery G of the embodiment 7 is found in almost eliminating the decrease of discharge capacity at the first cycle (initial loss) relative to that of the charging capacity at the first cycle. This is because the lithium, whose amount corresponds to the side reaction with the conductive agent or the binding agent with respect to lithium ion generated by charging/discharging or corresponds to the remaining lithium occluded in MnO on charging without emitting on discharging, is spontaneously occluded by reacting with the negative electrode composite agent since the battery is made up on the negative electrode composite agent by layer-building to produce such a laminated electrode in contact with the electrolyte solution in the battery. Therefore, thereafter loss occurrence relating to the lithium in the negative electrode on charging and discharging is prevented.

Furthermore, composite oxide containing boron as a positive active material is used to increase the charging/ discharging capacity, and thus it is found to improve the cycle deterioration considerably.

(Embodiment 9)

This embodiment uses a positive active material described below instead of the positive active material in the embodiment 8. A battery is produced in the same manner as in the embodiment 8 other than the positive active material.

The positive active material of this embodiment is produced as explained below. Lithium hydroxide $LiOH.H_2O$, cobalt carbonate $CoCO_3$ and silicon dioxide $SiO_2$ are weighed at a mol ratio of Li:Co:Si of 1:0.9:0.1 to be mixed sufficiently by the mortar, thereafter the mixture is heated, and baked at atmosphere of a temperature 850° C. for 12 hours, and after cooling, crushed and granulated into a particle with a diameter equal to or less than 53 μm. Two times of baking, crushing and granulating produce the composite oxide in a layer-like structure having approximate composition of $LiCo_{0.9}Si_{0.1}O_2$, which is used as a positive active material according to the present invention.

The battery thus obtained (hereinafter referred to as a "battery 1" for simplification) is performed of the charging/discharging cycle test as in the embodiment 8 to exhibit a high grade of charging/discharging characteristic and cycle characteristic each substantially similar to the battery H.

(Embodiment 10)

In this embodiment, $LiPF_6$ is dissolved at 1 mol/l into a mixed solvent of ethylene carbonate and diethyl carbonate at a volume ratio of 1:1 to produce an electrolyte solution and to be used instead of the electrolyte solution of the embodiment 8. The battery J is produced in the same manner as in the embodiment 8 with exception of the electrolyte solution.

The battery J is performed of the charging/discharging cycle test as in the embodiment 8, where the charging/discharging capacity at the first to fourth cycles is smaller by 20 to 3% compared to the battery H, but the thereafter repeated charging/discharging cycle provides minimized reduction of the discharge capacity (cycle deterioration) together with a high grade cycle characteristic.

In the embodiments, the counter electrodes have been shown and described only for cases of lithium–aluminum alloy, $LiCoO_2$ and $Li_aT_bL_cO_2$. However, the present invention is not limited to such examples. As hereinbefore described, it is understood that the electrode according to the present invention can be used combined with tire negative or positive electrodes as a counter electrode: first, the negative electrode using as an active material the materials capable of occluding and emitting lithium including; namely, metal lithium or alloys of lithium with the other metals such as Zn, Sn, Pb, Bi; lithium insertion compound such as carbon or $MoO_2$, $WO_2$, $Fe_2O_3$; conductive polymer capable of doping lithium ion such as polyacetylene, polypyrrole, polyacene, and the like: and secondly, the positive electrode as a counter electrode including as an active material the materials capable of occluding and emitting lithium cation and/or anion; namely, metal chalcogenide such as $TiS_2$, $MoS_2$, $NbSe_3$; metal oxide such as $MnO_2$, $MoO_3$, $V_2O_5$, $LixCoO_2$, $LixNiO_2$, $LixMn_2O_4$; conductive polymer such as polyaniline, polypyrrole, polyparaplienylene, polyacene; graphite intercalation compound; and the like.

As hereinbefore fully described, the present invention uses novel active materials composed of composite oxide $Li_x$ MO produced from metals or metalloid M other than alkali metals and lithium as an active material of at least either a negative electrode or a positive electrode of the non-aqueous electrolyte secondary battery, to produce a considerably larger charging/discharging capacity that is an amount capable of reversibly occluding and emitting lithium ion by charging and discharging, and to reduce polarization of charging and discharging, so that there can thus be obtained a considerably stable and long cycle life battery capable of charging and discharging at a larger current without deterioration such as decomposition and crystal disintegration due to excess charging and excess discharging. In particular, the active materials according to the present invention are used as a negative active material, which are combined with a positive electrode using the (nobler) active materials having an electrode potential equal to or more than as high as 3 V or 4 V for metal lithium such as metal oxide such as $V_2O_5$, $MnO_2$, $LiCoO_2$, $Li_xNiO_2$, $LiMn_2O_4$, and so forth, particularly like $Li_aT_bL_cO_2$, thereby a higher effect can be obtained in producing a long cycle life secondary battery having a high grade of charging/discharging characteristic with high voltage and high energy density.

What is claimed is:

1. A non-aqueous electrolyte secondary battery comprising: a negative electrode; a positive electrode; and a non-aqueous electrolyte with lithium ion conductivity; wherein either one or both of the negative and positive electrodes has an active material comprised of a composite oxide represented by composition formula, $Li_xMO$, where M represents one or more elements selected from metalloids and metals other than alkali metals, and x satisifies $0 \leqq x$.

2. A non-aqueous electrolyte secondary battery according to claim 1; wherein the non-aqueous electrolyte comprises at least a non-aqueous solvent containing ethylene carbonate and a supporting electrolyte containing lithium ion.

3. A non-aqueous electrolyte secondary battery comprising: a negative electrode; a positive electrode; and a non-aqueous electrolyte with lithium ion conductivity; wherein the negative electrode has an active material comprised of a composite oxide represented by composition formula $Li_xMO$, where M is one kind or more kinds of elements selected from Mn, Ti, Zn and metals and metalloids selected from Group 14 of the periodic table, and x satisfies $0 \leqq x$.

4. A non-aqueous electrolyte secondary battery according to claim 3; wherein the non-aqueous electrolyte comprises at least a non-aqueous solvent containing ethylene carbonate and a supporting electrolyte containing lithium ion.

5. A non-aqueous electrolyte secondary battery comprising: a negative electrode; a positive electrode; and a non-aqueous electrolyte with lithium ion conductivity; wherein the negative electrode has an active material comprised of a composite oxide represented by composition formula $Li_xMO$, where M represents one or more elements selected from metalloids and metals other than alkali metals, and x satisfies $0 \leqq x$; and wherein the positive electrode has an active material comprised of a composite oxide represented by composition formula $Li_aT_bL_cO_2$ and has a layer-like structure, where T is one or more transition metal elements, L is one or more metalloid elements selected from boron B and silicon Si, and a, b, and c satisfy $0<a \leqq 1.15$, $0.85 \leqq b+c \leqq 1.3$, and $0 \leqq c$.

6. A non-aqueous electrolyte secondary battery according to claim 5; wherein the non-aqueous electrolyte comprises at least a non-aqueous solvent containing ethylene carbonate and a supporting electrolyte containing lithium ion.

7. A method for producing a non-aqueous electrolyte secondary battery having a negative electrode, a positive electrode and a non-aqueous electrolyte with lithium ion conductivity, the method comprising: incorporating lithium ion into a monoxide MO or a metal or a metalloid by electrochemical reaction; and producing a composite oxide $Li_xMO$ of the metal or the metalloid and lithium inside the battery after assembly of the battery, or inside or outside the battery during production of the battery.

8. A non-aqueous electrolyte secondary battery comprising: positive and negative electrodes separated by a non-aqueous electrolyte capable of conducting lithium ions, at least one of the positive and negative electrodes being comprised of an active material composed of a composite oxide $Li_xMO$, where M is one or more elements selected from metalloids and metals other than alkali metals, and x is $0 \leqq x$.

9. A non-aqueous electrolyte secondary battery according to claim 8; wherein the negative electrode has an active material composed of a composite oxide $Li_xMO$, where M is one or more metalloids and metals selected from Group 14 of the periodic table.

10. A non-aqueous electrolyte secondary battery according to claim 9; wherein the positive electrode has an active material composed of a composite oxide $Li_aT_bL_cO_2$, where T is one or more transition elements, L is one or more metalloid elements selected from the group consisting of boron and silicon, and a, b and c are $0<a \leqq 1.15$, $0.85 \leqq b+c \leqq 1.3$, and $0 \leqq c$.

11. A non-aqueous electrolyte secondary battery according to claim 10; wherein the positive electrode has a layered structure.

12. A non-aqueous electrolyte secondary battery according to claim 11; wherein the non-aqueous electrolyte includes a non-aqueous solvent and an electrolyte containing lithium ions.

13. A non-aqueous electrolyte secondary battery according to claim 9; wherein the non-aqueous electrolyte includes a non-aqueous solvent and an electrolyte containing lithium ions.

14. A non-aqueous electrolyte secondary battery according to claim 8; wherein the positive electrode has an active material composed of a composite oxide $Li_aT_bL_cO_2$, where T is one or more transition elements, L is one or more metalloid elements selected from the group consisting of boron and silicon, and a, b and c are $0<a \leqq 1.15$, $0.85 \leqq b+c \leqq 1.3$, and $0 \leqq c$.

15. A non-aqueous electrolyte secondary battery according to claim 14; wherein the positive electrode has a layered structure.

16. A non-aqueous electrolyte secondary battery according to claim 14; wherein the non-aqueous electrolyte includes a non-aqueous solvent and an electrolyte containing lithium ions.

17. A non-aqueous electrolyte secondary battery according to claim 8; wherein the non-aqueous electrolyte includes a non aqueous solvent and an electrolyte containing lithium ions.

18. A non-aqueous electrolyte secondary battery according to claim 8; wherein M is one or more elements selected from Mn, Ti, Zn, metalloids and metals selected from Group 14 of the periodic table.

19. A non-aqueous electrolyte secondary battery according to claim 18; wherein the non-aqueous electrolyte includes a non-aqueous solvent and an electrolyte containing lithium ions.

* * * * *